(12) United States Patent
Rotta

(10) Patent No.: US 10,368,684 B2
(45) Date of Patent: Aug. 6, 2019

(54) MACHINE FOR THE PREPARATION OF LIQUID PRODUCTS USING CAPSULES

(71) Applicant: LUIGI LAVAZZA S.p.A., Turin (IT)

(72) Inventor: Denis Rotta, Turin (IT)

(73) Assignee: LUIGI LAVAZZA S.P.A., Turin (IT)

( * ) Notice: Subject to any disclaimer, the term of this patent is extended or adjusted under 35 U.S.C. 154(b) by 131 days.

(21) Appl. No.: 15/524,458

(22) PCT Filed: Oct. 23, 2015

(86) PCT No.: PCT/IB2015/058187
§ 371 (c)(1),
(2) Date: May 4, 2017

(87) PCT Pub. No.: WO2016/071796
PCT Pub. Date: May 12, 2016

(65) Prior Publication Data
US 2018/0078082 A1   Mar. 22, 2018

(30) Foreign Application Priority Data

Nov. 6, 2014   (IT) .............................. TO2014A0921

(51) Int. Cl.
*A47J 31/36* (2006.01)
(52) U.S. Cl.
CPC ....... *A47J 31/3638* (2013.01); *A47J 31/3633* (2013.01)
(58) Field of Classification Search
CPC .... A47J 31/407; A47J 31/3676; A47J 31/368; A47J 31/3695; A47J 31/3623; A47J 31/3628; A47J 31/3633; A47J 31/3638
See application file for complete search history.

(56) References Cited

U.S. PATENT DOCUMENTS

| | | | | |
|---|---|---|---|---|
| 6,026,732 A | * | 2/2000 | Kollep | A47J 31/0668 99/295 |
| 8,621,984 B2 | * | 1/2014 | Vicentini | A47J 31/3638 99/289 R |

(Continued)

FOREIGN PATENT DOCUMENTS

| DE | 10 2010 04494 | 12/2011 |
|---|---|---|
| WO | WO 2012/168917 | 12/2012 |

OTHER PUBLICATIONS

International Search Report for PCT/IB2015/058187, dated Feb. 1, 2016, 4 pages.

(Continued)

*Primary Examiner* — Eric Keasel
(74) *Attorney, Agent, or Firm* — Nixon & Vanderhye PC

(57) ABSTRACT

A machine for the preparation of liquid products via capsules comprising a delivery assembly with a preparation chamber, which comprises a first part and a second part. The second part of chamber comprises an injector device, which is configured for introducing a preparation fluid into a capsule and has a hollow body and includes a first body part and a second body part. Defined between the two body parts is a chamber, housed in which is a perforation device having at least one front perforation element that is axially aligned to a respective through hole, defined in a front wall of the second body part of the injector device. The second body part is slidable, against the action of elastic means, from an advanced position, in which the at least one perforation element does not project substantially beyond the front wall, to a retracted position, where the at least one perforation element projects substantially beyond the front wall. The elastic means comprise a bending spring that extends in a direction transverse to the direction of axial sliding (X) of the second body part with respect to the first body part.

17 Claims, 15 Drawing Sheets

(56) References Cited

U.S. PATENT DOCUMENTS

| | | | |
|---|---|---|---|
| 9,119,504 B2 * | 9/2015 | Bugnano | A47J 31/30 |
| 9,259,118 B2 * | 2/2016 | Jing | A47J 31/407 |
| 9,351,602 B2 * | 5/2016 | Icardi | A47J 31/3633 |

OTHER PUBLICATIONS

Written Opinion of the ISA for PCT/IB2015/058187, dated Feb. 1, 2016, 4 pages.

* cited by examiner

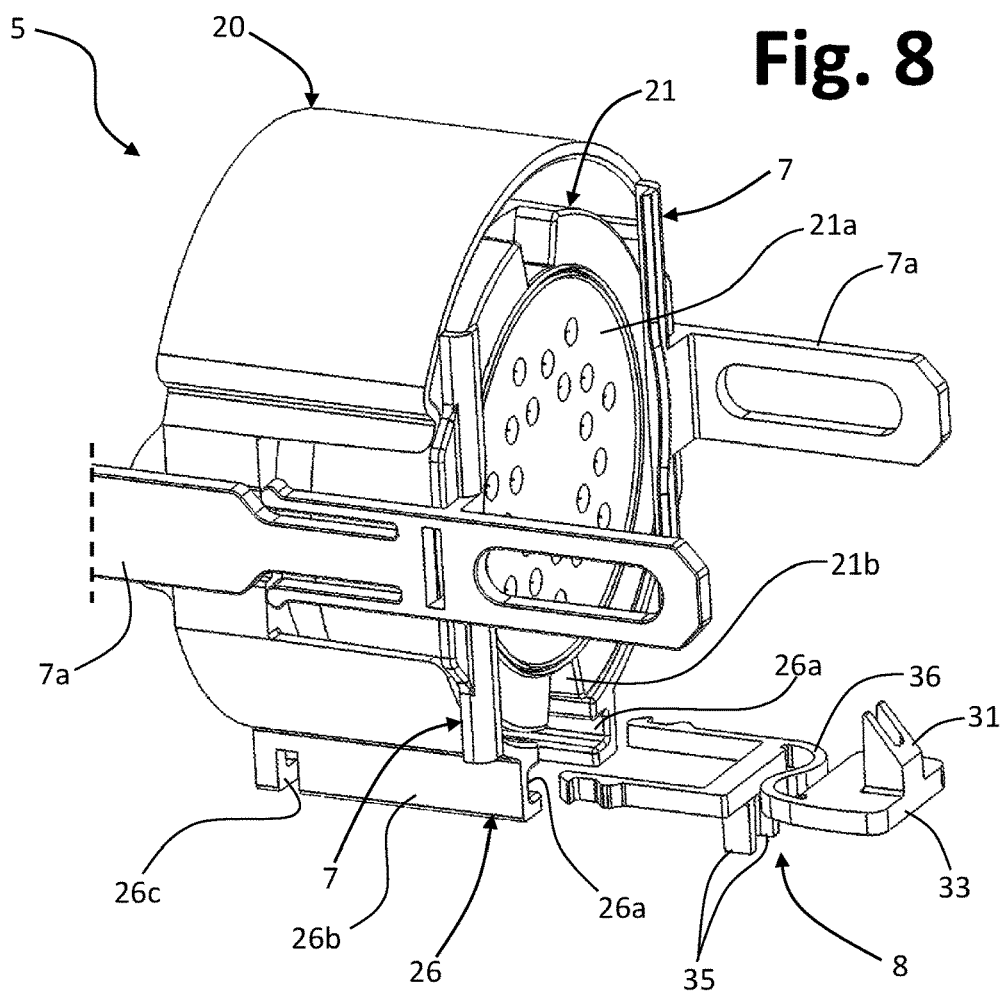
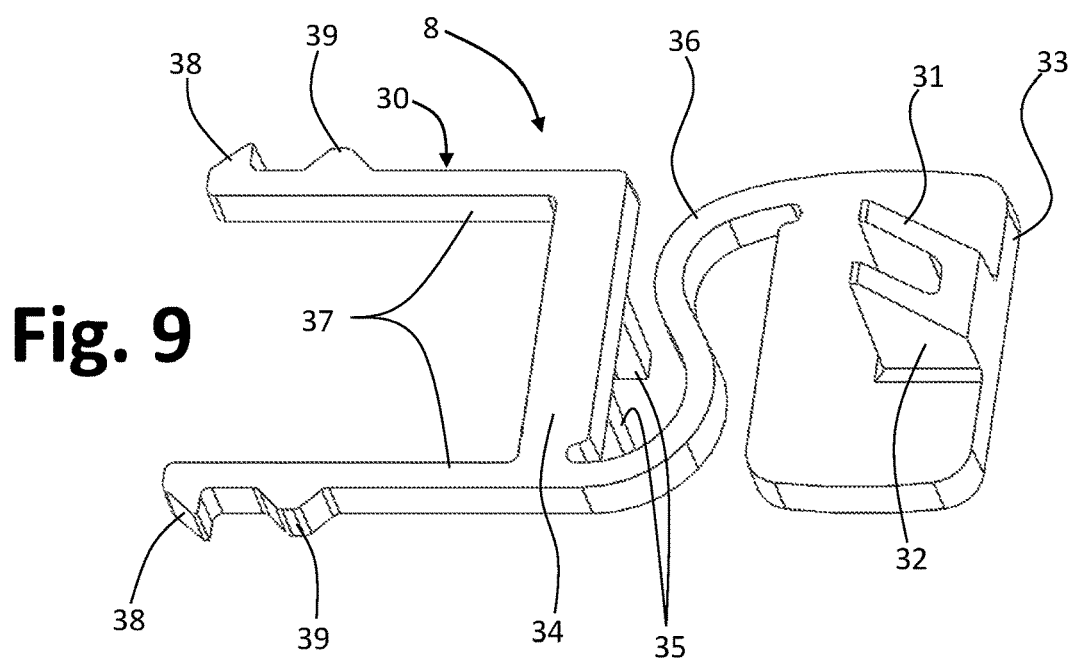

MACHINE FOR THE PREPARATION OF LIQUID PRODUCTS USING CAPSULES

This application is the U.S. national phase of International Application No. PCT/IB2015/058187 filed Oct. 23, 2015 which designated the U.S. and claims priority to IT Patent Application No. TO2014A000921 filed Nov. 6, 2014, the entire contents of each of which are hereby incorporated by reference.

TECHNICAL FIELD

The present disclosure relates to machines for the preparation of beverages and liquid products in general by means of capsules. The invention has been developed with particular reference to delivery assemblies for machines of the type referred to.

PRIOR ART

Delivery assemblies for machines for the preparation of liquid products via capsules usually comprise a preparation chamber made up of two parts, at least one of which is movable with respect to the other. One part of the chamber is constituted by a capsule-holder, whereas the other part is constituted by an injector device.

From WO 2012/168917 A, filed in the name of the present applicant, on which the preamble of Claim 1 is based, a machine is known, the delivery assembly of which comprises a movable injector and a stationary capsule-holder. The assembly further comprises means for guiding and withholding a capsule, which include a lower supporting member. The supporting member is slidably associated to the lower part of the body of the injector in order to be able to assume an advanced position, in which the capsule is supported coaxial to the injector and the capsule-holder, and a retracted position, where the capsule is free to drop towards a discharge passage of the assembly. The supporting member is switched into the two aforesaid positions by means of a mechanical interference thereof with corresponding stop elements of the fixed structure of the assembly. In particular, during loading of the assembly and with the injector in an initial position, the supporting member is in an advanced position so as to support the capsule also in the course of the subsequent movement of the injector towards the capsule-holder. Almost at the end of this movement, the supporting member interferes with a first stop element, moving into its retracted position. In this way, after delivery of the liquid product and when the injector is brought back into the initial position, the supporting member does not hinder dropping by gravity of the capsule that in the mean time is ejected from the capsule-holder. In the course of the same movement of return of the injector into its initial position, the supporting member interferes with a second stop element, moving again into its advanced position, ready for supporting a new capsule.

The present applicant has noted that in occasional conditions the withholding arrangement described in WO 2012/168917 A renders problematical extraction of a spent capsule from the delivery assembly. This may occur when the front sealing foil of a capsule gets stuck at the front of the injector, preventing subsequent dropping of the capsule, or else if there is excessive swelling of the aforesaid foil, which causes jamming of the flange of the capsule in the corresponding guide means. In these conditions, the capsule thus remains pushed up against to the front of the injector, also following upon return of the latter into its initial position. This means that, underneath the capsule, the supporting member is in its advanced position and hinders any action of manual expulsion of the capsule itself. The user must thus try to extract the capsule from the top of the assembly, i.e., through the opening for introduction of the capsules, using his fingers or else with the aid of tweezers or some other tool.

OBJECT AND SUMMARY

In its general terms, the aim of the present invention is to solve the aforesaid drawbacks in a simple and inexpensive way. This and other aims still, which will emerge clearly hereinafter, are achieved according to the present invention thanks to a machine for the preparation of beverages and liquid products in general having the characteristics recalled in claim 1. Advantageous developments of the invention form the subject of the dependent claims. The claims form an integral part of the technical teaching provided herein in relation to the invention.

BRIEF DESCRIPTION OF THE DRAWINGS

The invention will now be described, purely by way of non-limiting example, with reference to the annexed drawings, wherein:

FIG. 8 is a schematic partially exploded perspective view of a part of a delivery assembly of a machine according to one embodiment of the invention;

FIG. 9 is a schematic perspective view of a supporting member that can be used in a machine according to one embodiment of the invention;

DESCRIPTION OF PREFERRED EMBODIMENTS

Figure 1:
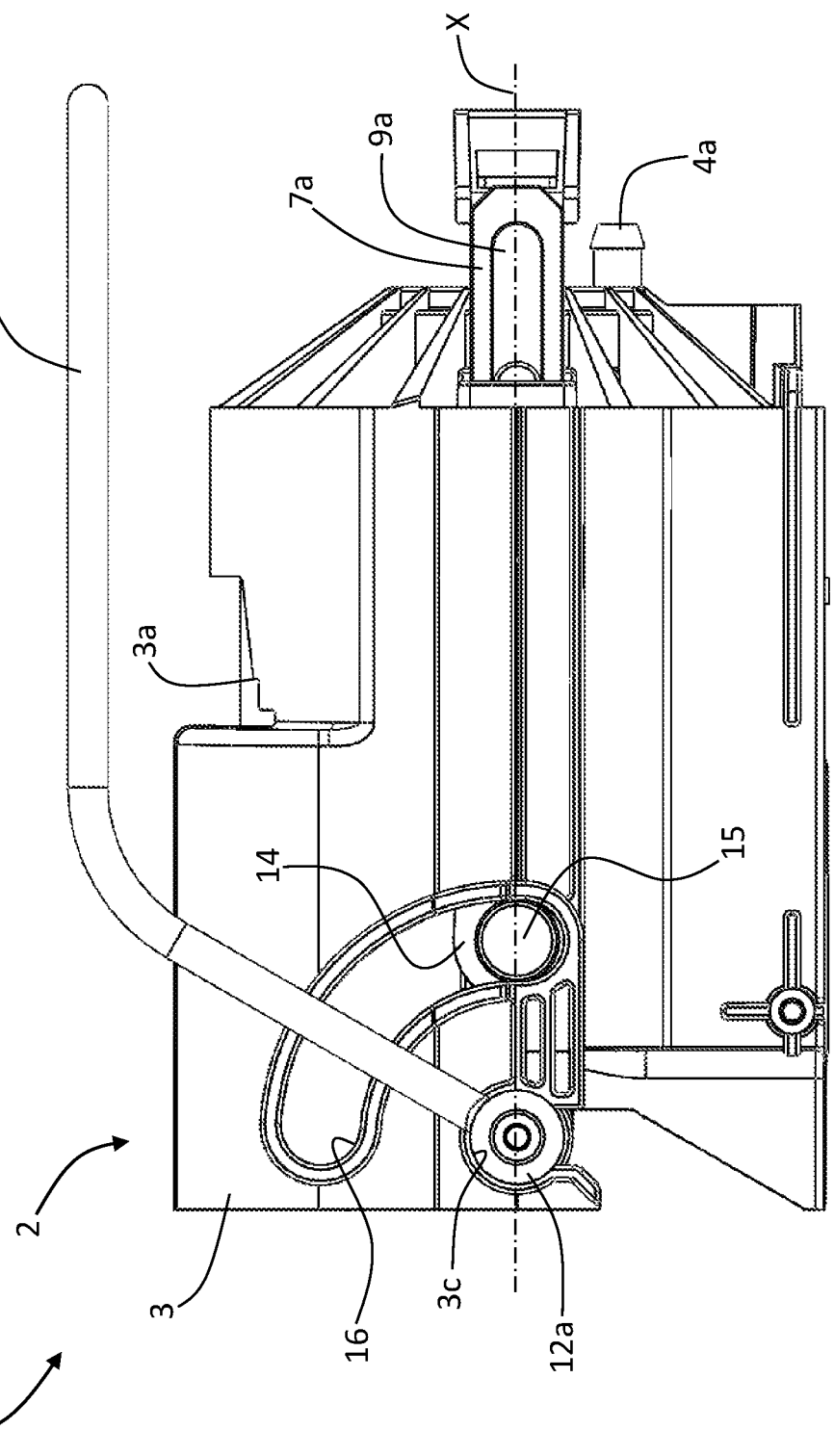
FIG. 1 is a schematic view in side elevation of a machine for the preparation of liquid products according to one embodiment of the invention.

Reference to "an embodiment" or "one embodiment" in the framework of the present description is meant to indicate that a particular configuration, structure, or characteristic described in relation to the embodiment is comprised in at least one embodiment. Hence, phrases such as "in an embodiment" or "in one embodiment" and the like that may be present in various points of this description do not necessarily refer to one and the same embodiment. Furthermore, particular conformations, structures, or characteristics may be combined in any adequate way in one or more embodiments. The references used herein are merely provided for convenience and hence do not define the sphere of protection or the scope of the embodiments.

It is moreover pointed out that the machine according to possible embodiments of the invention will be illustrated and described limitedly to some parts of a delivery assembly thereof, which constitute a specific aspect of the invention, taking for granted that associated to this assembly are all the other elements in themselves known for operation of an ordinary machine for the preparation of beverages via capsules, amongst which, for example, a water tank, an electric pump, an electric heater, a user interface, etc.

Partially and schematically represented In FIGS. 1-4 is a machine 1 for preparation of liquid products via capsules, in particular for the preparation of coffee. The machine 1 has a delivery assembly 2 having a casing 3, located in which is a preparation chamber comprising two parts, at least one of which is movable with respect to the other. In the example illustrated, the first part includes a capsule-holder 4, defining a housing configured for receiving at least partially a capsule and delivering the liquid product obtained by means thereof, and for this purpose the capsule-holder 4 has an outlet 4a of its own. In the example, the capsule-holder 4 is stationary and at least part of its structure is defined by the casing 3.

The second part of the infusion chamber comprises an injector device 5, referred to hereinafter for simplicity as "injector", configured for introducing in a capsule a preparation fluid, such as water and/or steam under pressure, supplied by means of a respective inlet 5a. In the example illustrated, the injector 5 is substantially coaxial to the capsule-holder 4 and is mounted so as to shift linearly inside the casing 3 according to an axis designated by X in FIG. 1, via guides of any known conception. For instance, in one embodiment, defined on each of the two opposite sides of the casing 3 is a linear guide, and engaged in these two guides—which are parallel to one another and with respect to the axis of the assembly 2—are respective lateral guide elements of the injector 5, for example the ends of a pin belonging to an actuation system of the assembly 2.

The assembly 2 comprises an inlet passage and an outlet passage for the capsules, and a supporting arrangement, described hereinafter, which comprises a supporting member that is able to keep a capsule in a position that is substantially coaxial to the capsule-holder 4 and to the injector 5. The assembly further comprises guide means, configured so as to guide a capsule as far as the aforesaid position that is substantially coaxial to the two parts of the preparation chamber 4-5.

Figure 2:
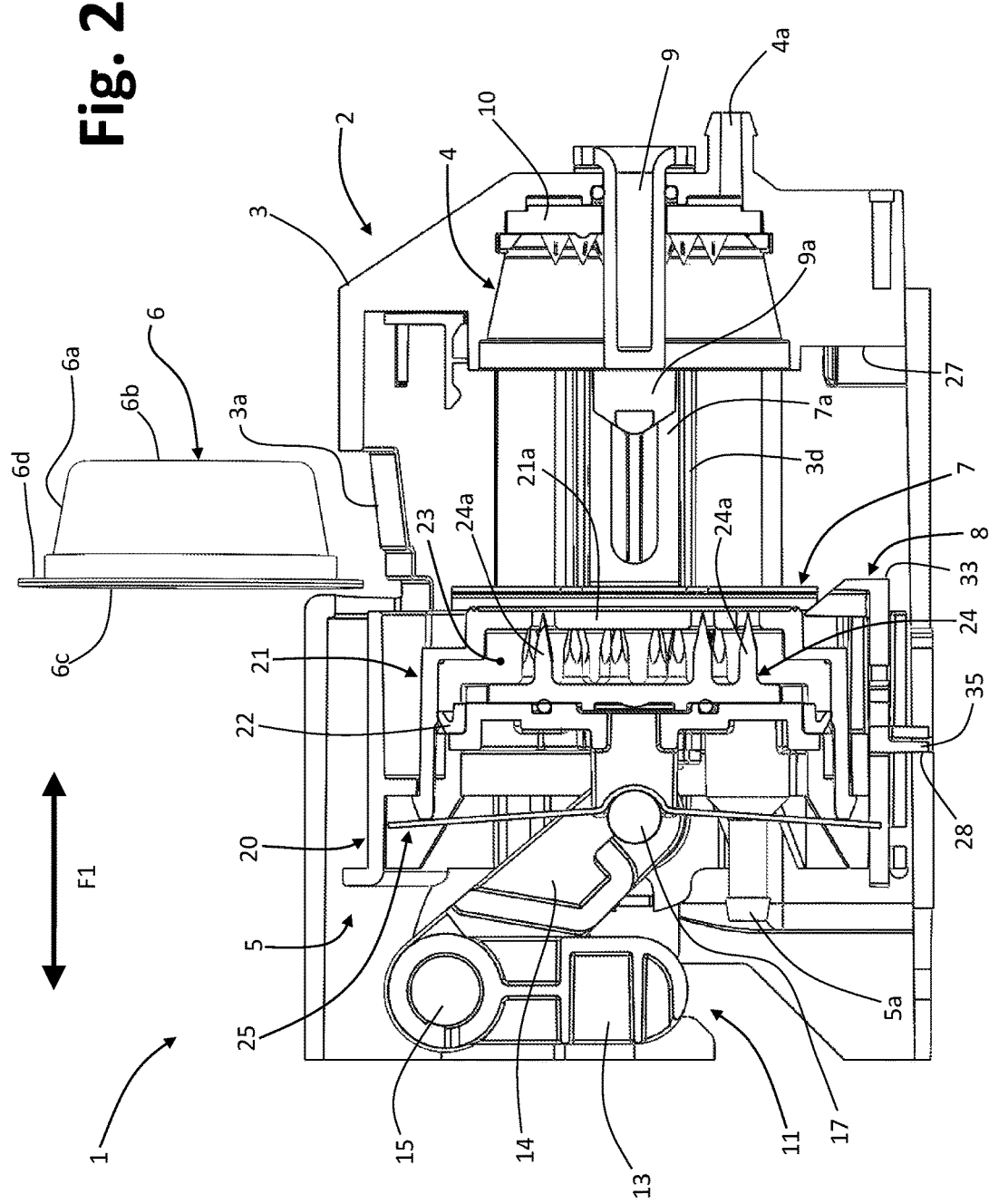
FIG. 2 is a partial and schematic longitudinal section of a machine according to one embodiment of the invention, in a first condition.
Figure 3:
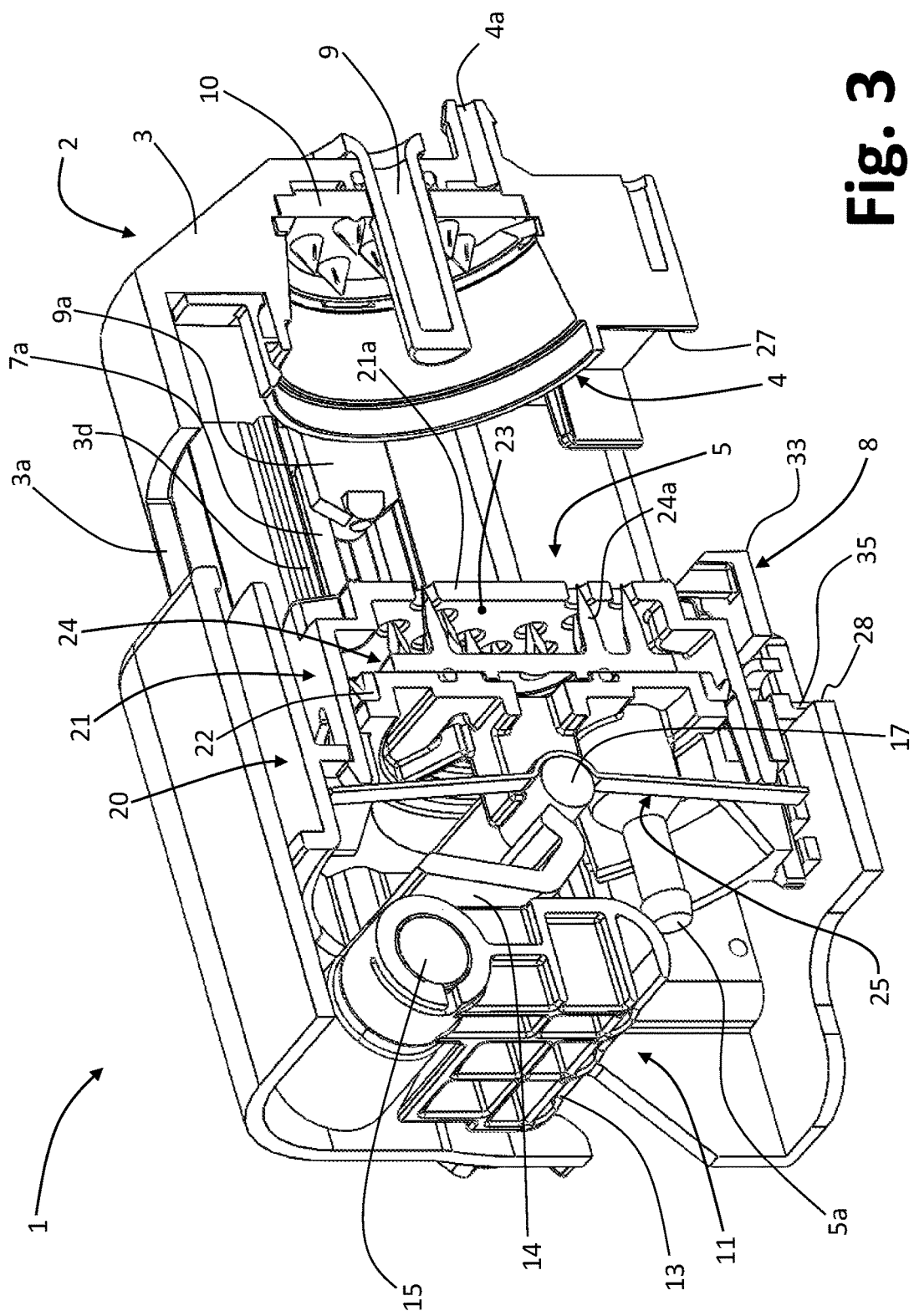
FIGS. 3 and 4 are partially sectioned schematic perspective views of the machine of FIG. 2 in the aforesaid first condition.
Figure 4:
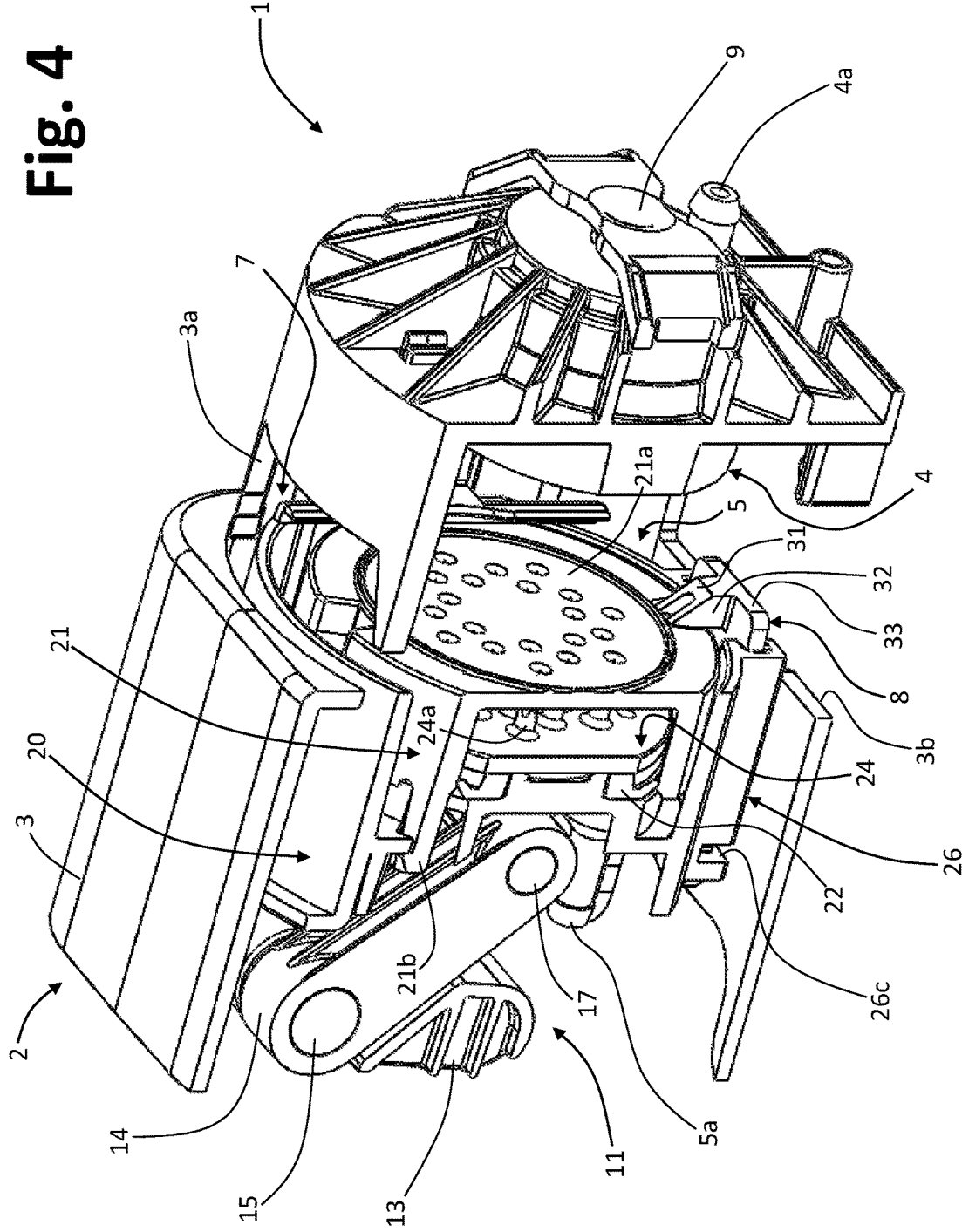

A capsule that can be used in the assembly 2 is designated by 6 in FIG. 2. In the example, the capsule 6, of a conception in itself known, has a substantially cup-shaped body, with a peripheral wall 6a and a bottom 6b, and a closing wall 6c opposite to the bottom 6b, preferably formed by a sealing foil. The body 6a defines, at its mouth opposite to the bottom 6b, a flange 6d on which the closing wall 6c is fixed, for example via heat sealing. Housed inside the cup-shaped body is a dose of a precursor that is able to form a liquid product via a preparation fluid, such as water and/or steam under pressure, the precursor comprising, for example, ground coffee.

In one embodiment, such as the one exemplified in the figures, the casing 3 has, in its top part, an entry opening 3a, which provides the aforesaid inlet passage. In the example, the profile of the opening 3a substantially corresponds to the cross section of the capsule 6 so as to enable guided introduction thereof with relative precision into the assembly 2. To the opening 3a there corresponds, in the lower part of the casing 3, an opening for discharging the capsule, which is partially visible for example in FIG. 4, where it is designated by 3b.

The aforesaid guide means for the capsule are located at generally opposite side parts of the injector 5 and are configured for constraining a capsule 6 laterally. In the example illustrated, the guide means comprise two generally vertical guides 7, which are located a little beyond the front of the injector 5, at a fixed distance from one another. Each guide 7 has a respective first portion generally facing the front of the injector 5 so as to delimit, with the latter, a sliding space for the flange 6d of the capsule 6. The guides 7 are preferably movable together with the injector 5. For this purpose, the guides 7 may be fixed to the body of the injector 5 or else be configured as distinct components, but fixed in motion with respect to the injector. In one embodiment, for example, each vertical guide 7 is fixed with respect to a respective sliding element 7a (see also FIG. 5) that is engaged in a corresponding horizontal guide defined in a respective side of the casing 3; one such guide is designated, for example, by 3d in FIG. 2. As may be appreciated, for example, in FIGS. 2 and 4, with the injector in its initial position, i.e., set at a distance from the capsule-holder 4, the vertical guides 7 are located underneath the entry opening 3a so as to be able to receive the flange 6d of the capsule 6.

Provided at the lower part of the injector 5, preferably in a central position, is the aforementioned supporting member, designated as a whole by 8, and described hereinafter in detail.

Preferably, the assembly 2 also includes means for extraction or expulsion of a spent capsule from the housing defined by the capsule-holder 4. These means may be of any type known in the sector. In one embodiment, such as the one exemplified in the figures, these means include an ejector member 9, which is mounted movable in an opening provided in the bottom of the capsule-holder 4. The specific construction and the modalities of actuation of the ejector member 9 are irrespective of the purposes of the invention and consequently will not be described herein. In the example of embodiment illustrated, the ejector member 9 has associated two lateral connection arms, designated by 9a (see also FIG. 5), which are generally set parallel to the sliding elements 7a that are fixed with respect to the vertical guides 7 and coupled to them. In this way, movement of the injector 5 and of the sliding elements 7a causes movement of the connection arms 9a, and hence of the ejector member 9.

A perforation device, comprising one or more tips or reliefs, may be associated to the bottom wall of the capsule-holder 4. Once again with reference to the example illustrated, one such perforation device, which is also of any known type, is designated by 10 and has a central passage for the ejector member 9. Irrespective of the specific conformation of such a device 10, the liquid that flows out of the capsule 6, which is torn at the bottom by the aforesaid tips, can reach the passage 4a. The latter may be connected, for example via a suitable duct, to a nozzle for delivery of the liquid product. The invention may in any case be applied also to the case of delivery assemblies for capsules having a pre-perforated bottom wall, in which case it is not necessary to provide a perforation device inside the capsule-holder 4.

Displacement of the injector 5 in the two opposite directions indicated by the arrow F1 of FIG. 2 is obtained by means of an actuation system, designated as a whole by 11. In various embodiments, the actuation system 11 comprises a mechanism substantially of a toggle type or a mechanism comprising a rocker and at least one connecting-rod member, for example one that may be operated manually by a user via a purposely provided lever, of the same type as that designated by 12 in FIG. 1. In other embodiments, the actuation mechanism may include gears or an electric driving motor. Also the actuation system 11 may in fact be of any type known in the sector.

In one embodiment, such as the one exemplified in the figures, the actuation system 11 includes a rocker 13, with two opposite pins 13a (FIG. 5) rotatably constrained in respective seats (one of which is designated by 3c in FIGS. 1 and 5), defined in the two opposite sides of the casing 3, there being associated to these pins of the rocker 13 the ends 12a of the lever 12. The rocker 13 is articulated to a connecting-rod member 14 via a pin 15, movable in arched guide slits defined on the two opposite sides of the casing 3, one of which is designated by 16 in FIGS. 1 and 5. The connecting-rod member 14 is constrained, via a second pin 17, to the body of the injector 5. The axes of rotation of the actuation system 11 identified by the pins 13a of the rocker 13 and by the pins 15 and 17 are hence substantially perpendicular to the direction of linear displacement F1 of the injector 5 with respect to the capsule-holder 4.

Figure 5:
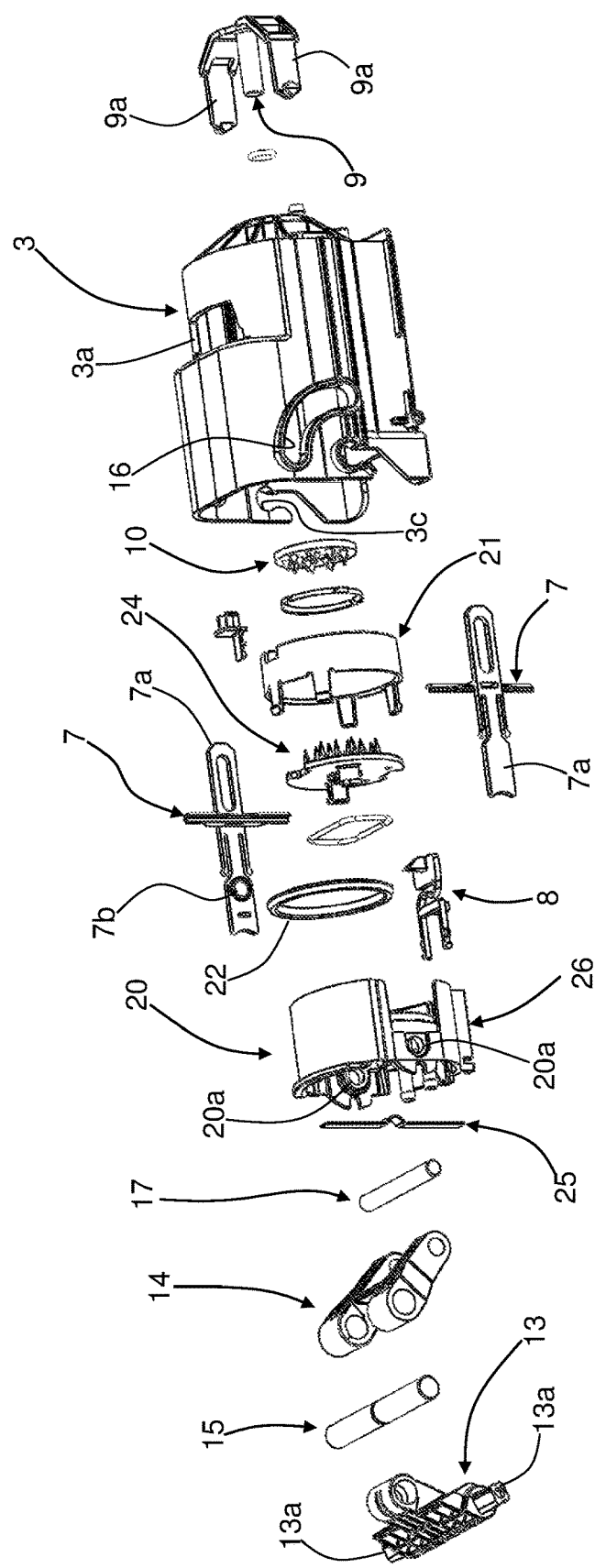
FIG. 5 is an exploded schematic view of a delivery assembly of a machine according to one embodiment of the invention.

In a preferred embodiment, each end of the pin 17 is coupled to one of the sliding elements 7a, which is purposely provided with a corresponding seat 7b (FIG. 5). In this way, as has been said, via the actuation system 11 the linear movements of the injector 5, of the guides 7, and of the ejector member 9 can be brought about.

With reference, in particular, to FIGS. 2-5, the injector 5 has a generally hollow body that includes at least one first body part 20 and one second body part 21, which is axially slidable with respect to the first body part 20, these two parts being mounted preferably in a substantially telescopic way with a sealing member 22 set in between. In the example illustrated in the figures, the axis of sliding between the body parts 20 and 21 substantially corresponds to the axis X of displacement of the injector 5 with respect to the capsule-holder 4. In what follows, for simplicity, the parts 20 and 21 will be defined as "injector body" and "lid", respectively. In one embodiment, such as the one exemplified, the injector body 20 is approximately cylindrical and has, on two opposite sides, circular through seats 20a (FIG. 5), which can be engaged by the pin 17 connected to the connecting-rod member 14. Also the lid 21 has a substantially cylindrical hollow shape, with an end wall 21a that basically provides a front wall of the injector 5.

Figure 6:
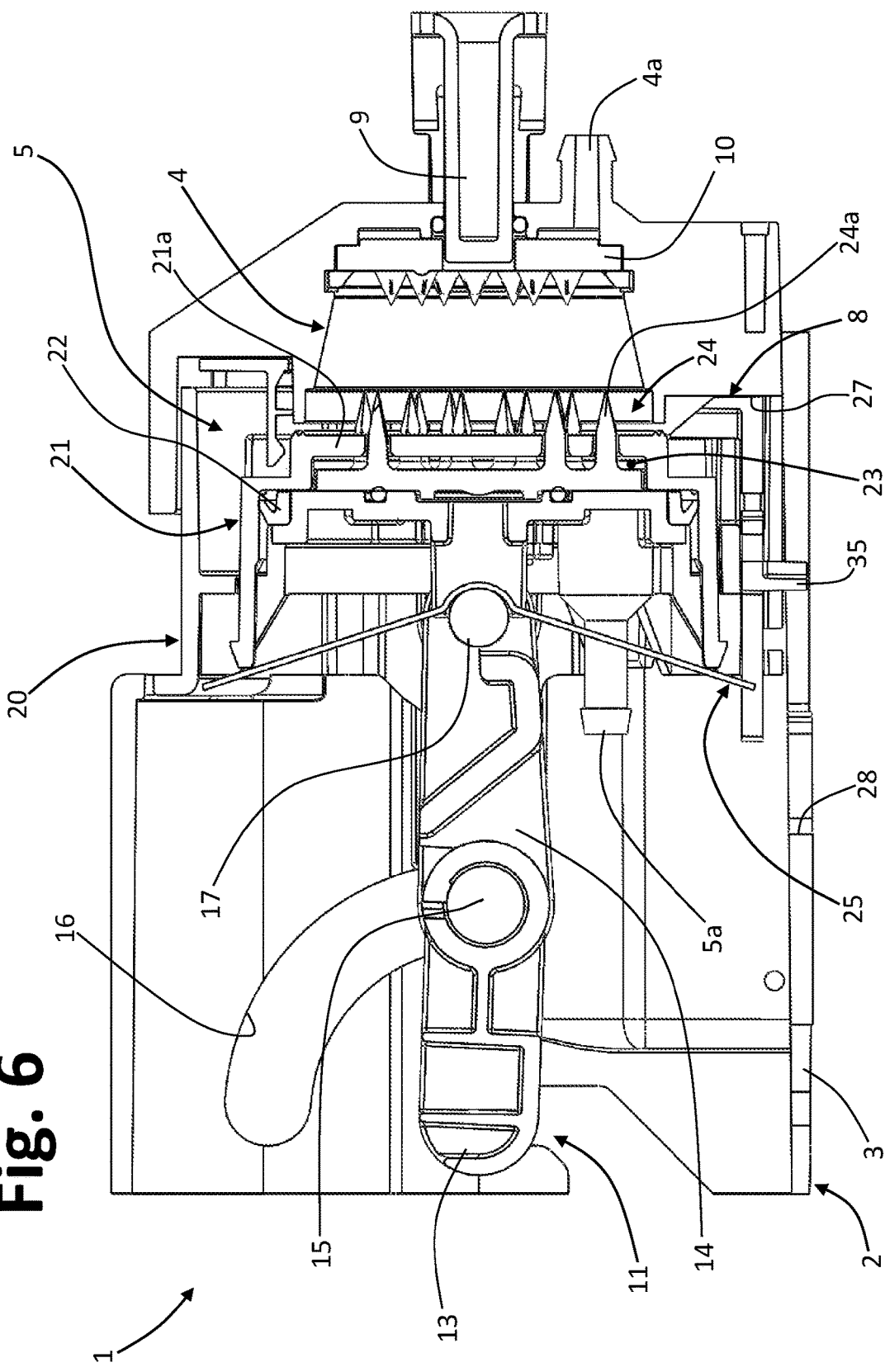
FIGS. 6 and 7 are views similar to those of FIGS. 2 and 3, with the machine in a second condition.
Figure 7:
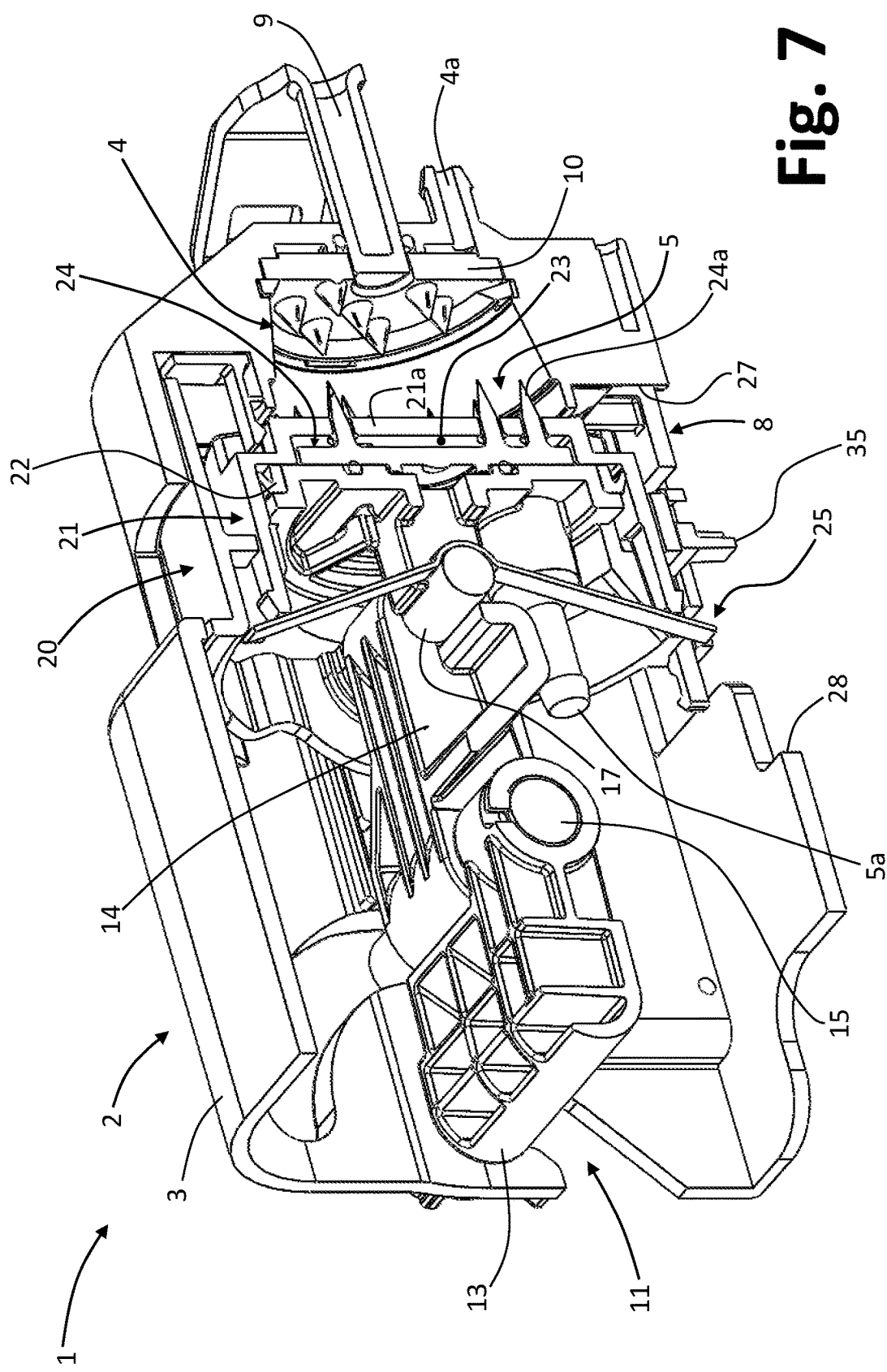

The general structure of the injector may be of any type known in the sector and for this reason will not be described in detail, apart from the aspects regarding a slide guide for the supporting member 8. With reference to the embodiment illustrated, defined between the injector body 20 and the lid 21 is a chamber 23, at least partially housed in which is a perforation device, designated as a whole by 24, having a plurality of front perforating elements that are axially aligned to respective through holes defined in the front wall 21a of the lid 21. The lid 21 is able to slide against the action of elastic means, from an advanced position (visible in FIGS. 2-4) to a retracted position (visible in FIGS. 6-7). In an advantageous embodiment, such as the one illustrated in the figures, the aforesaid elastic means comprise a bending spring 25, in particular a flat or leaf spring, which extends in a direction transverse to the direction of axial sliding X of the lid 21 with respect to the injector body 20. In the aforesaid advanced position of the lid 21 (see FIGS. 2-4), the tips 24a of the perforation device 24 do not project substantially beyond the front wall 21a of the lid. Instead, in the aforesaid retracted position (see FIGS. 6-7), the tips 24a project considerably beyond the wall 21a in order to be able to perform their perforating function, as described hereinafter.

Figure 11:
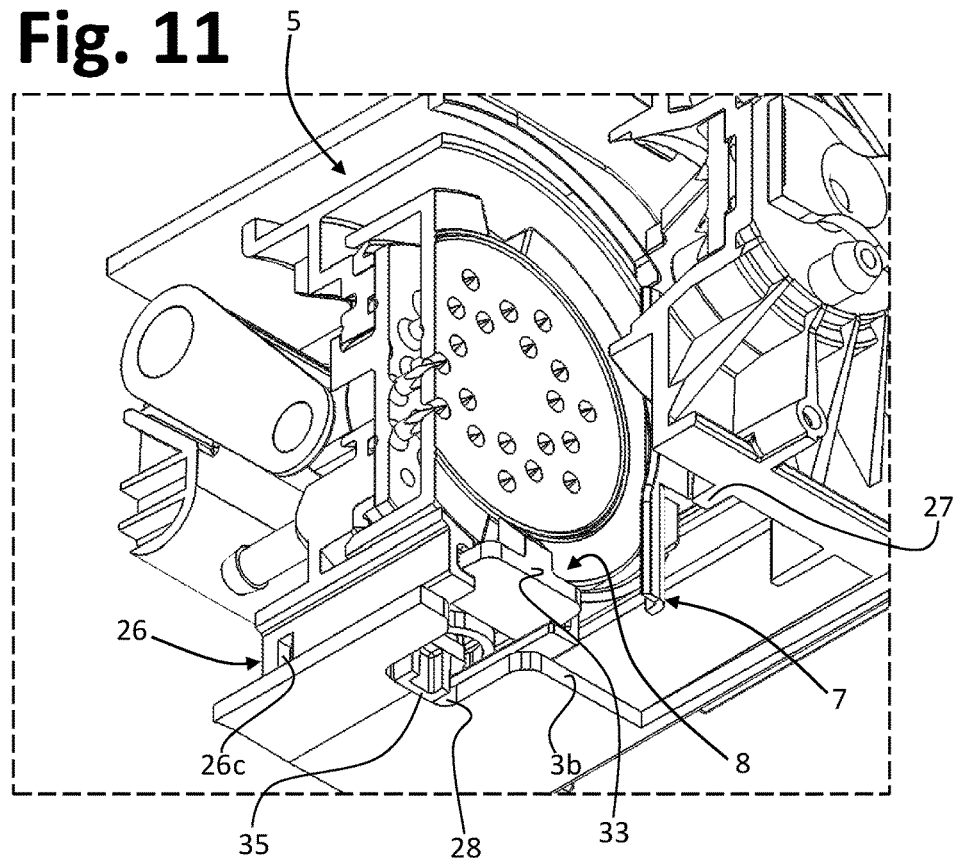

The supporting member 8 is mounted displaceable in a corresponding slide guide provided in the lower part of the injector; one such guide is, for example, visible in FIG. 8, where it is designated by 26. In one embodiment, the guide 26, preferably associated or formed integral with the lower area of the injector body 20, includes two facing guide grooves 26a, set generally parallel to one another and with respect to the axis X. These grooves 26a are defined by respective substantially parallel walls 26b of the guide 26, here walls having a C-shaped section. The grooves 26a are open at both of their axial ends, and provided along their development is at least one engagement seat, one of which is designated by 26c. In the example illustrated, each seat 26c consists of a through opening made in the corresponding wall 26b. Once again visible in FIG. 8 is the supporting member 8, designed for coupling in the guide 26, in particular in its grooves 26a. Yet again from FIG. 8 it may be noted how, in a preferred embodiment, the injector 5 defines a recess 21b, which extends in particular between the front and the peripheral part of the lid 21. The recess 21b, defined in the lower part of the lid 20 preferably in a central position, is designed to house a portion of the member 8, in particular a supporting portion thereof, as will emerge hereinafter. The supporting member 8 is in fact movable in the corresponding guide 26 between an advanced position of retention (visible for example in FIG. 11) and a retracted position of release (visible for example in FIG. 13), where in these positions the capsule 6 is kept in the position where it is substantially coaxial to the injector and the capsule-holder or else can drop towards the outlet passage 3b, respectively. As will be seen, when the member 8 is in its retracted position of release, the aforesaid supporting portion can be housed in the recess 21b.

The body of the supporting member 8 may interfere mechanically with two stop elements, during movement of the injector 5 towards the position close to the capsule-holder 4 or else towards the position spaced apart with respect to the capsule-holder 4, respectively. The aforesaid stop elements, preferably a front stop element and a rear stop element, belong to the stationary structure of the assembly 2, here represented by the casing 3. The stop elements could in any case be defined also by a body of the machine within which the assembly 2 is installed.

Figure 10:
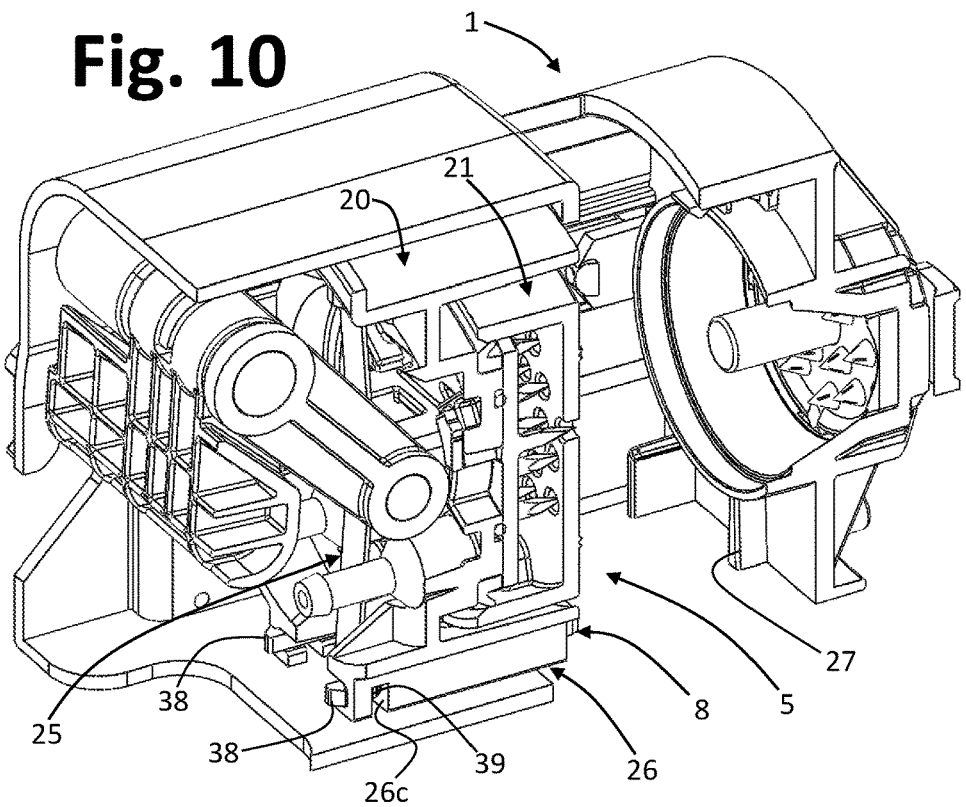
FIGS. 10 and 11 are partial and schematic perspective views, from different angles, of a delivery assembly of a machine according to one embodiment of the invention, in a first condition.

In one embodiment, a front stop element 27 and a rear stop element 28 are provided, which define contrast surfaces for a first part and a second part of the body of the supporting member 8. In the example of embodiment, the stop element 27 is located substantially just underneath the front of the capsule-holder 4, preferably at least slightly recessed with respect to the latter, in a position substantially aligned to the recess 21b of the front of the injector 5. Once again with reference to the example illustrated (see, for instance, FIGS. 10 and 12), the stop element 27 is defined integrally with the casing 3. The stop element 28 is located substantially in an area overlaid by the injector 5 when this is in the position of maximum distance from the capsule-holder 4. Preferably, also the stop element 28 is defined by the casing 3 of the assembly 2 and, in the example considered, basically consists of a slit or cut defined in a lower wall of the casing 3, this slit extending backwards in the direction of the axis of the assembly starting from the outlet opening 3b of the capsules (see, for example, FIGS. 11 and 13).

With reference to FIG. 9, the supporting member has a body 30 having a generally flattened configuration, in particular in such a way as to enable its insertion between the walls 26c of the guide 26, as may be inferred also from FIG. 8.

In a preferred embodiment, the body 31 defines at the top an inclined surface or plane for resting the capsule 6, in particular its flange. Very preferably, this inclined surface, designated by 31 in FIG. 9 belongs to a supporting portion 32 that rises from the body 30 at a front part 33 of the body itself. The surface 31 is inclined downwards starting from the back of the portion 32, which has dimensions such as to enable its housing in the recess 21b defined by the lid 21 of the injector (see FIG. 13). The front surface of the front part 33 and/or of the supporting portion is, instead, able to come into contact, i.e., interfere mechanically, with the contrast surface defined by the lower stop element 27, as explained hereinafter.

With reference once again to the embodiment exemplified in the figures, the body 30 of the supporting member 8 has an intermediate part 34, from which there projects downwards an appendage 35, the rear surface of which is designed to interfere mechanically with the stop element 28, i.e., with the bottom of the slit that constitutes it, as explained hereinafter.

Figure 13:
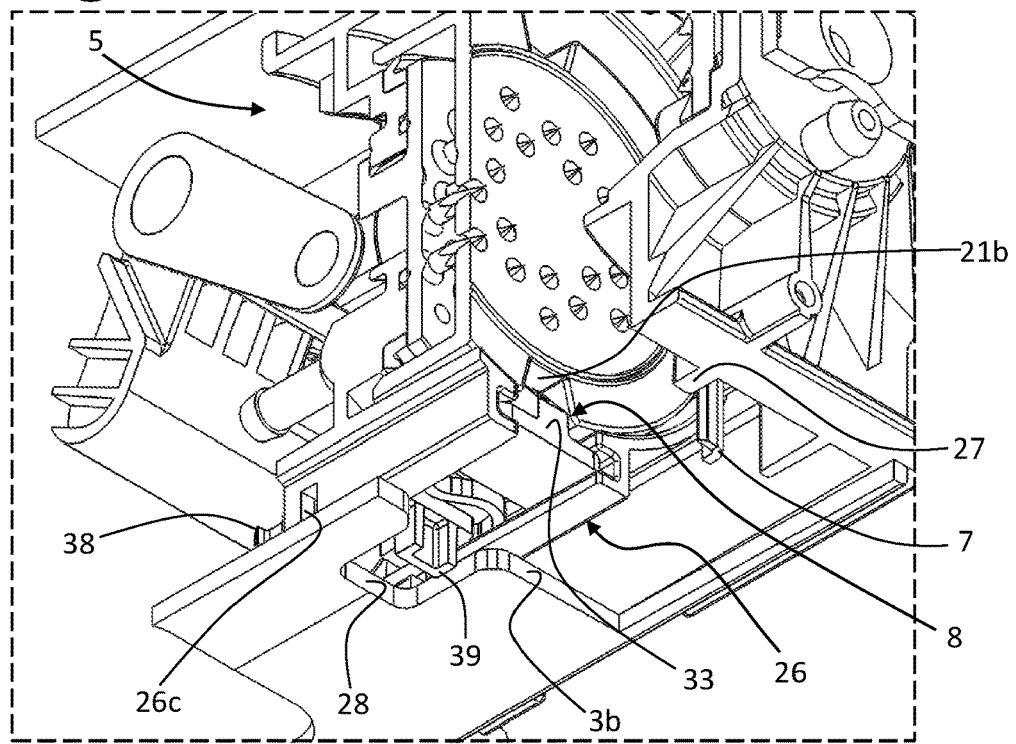

In the example illustrated, then, when the injector 5 is brought into the close position with respect to the capsule-holder 4, a mechanical interference is set up between the part 32 and/or the part 33 of the supporting member 8 and the stop element 27 so as to determine displacement of the member itself from its advanced position (FIG. 11) to its retracted position (FIG. 13). Instead, when the injector 5 is brought into its position spaced apart with respect to the capsule-holder 4, a mechanical interference is set up between the part 35 of the supporting member 8 and the stop element 28 so as to bring about return of the member itself from its retracted position to its advanced position.

According to an aspect of the invention, the body of the supporting member 8 comprises an elastic element, and the supporting arrangement to which the member 8 belongs is configured for enabling—with the injector 5 in the spaced apart with respect to the capsule-holder 4—a temporary recession of the supporting member 8 towards the position of release of the capsule against the action of the aforesaid first elastic element, following upon application on the capsule itself of a force of thrust towards the outlet passage 3b. In this way, as will be seen hereinafter, in the case where a spent capsule remains in contact with the front 21a of the injector 5, application of a thrust from above on the capsule itself enables recession of the member 8, thereby allowing the capsule to drop towards the discharge outlet 3b.

With reference to the embodiment of FIG. 9, the aforesaid elastic element is designated by 36. In the example, the element 36 is located between the front part 33 and the intermediate part 34 of the body 30 of the member 8 and is operative for urging these parts into a position where they are set apart from one another. In this way, as may be appreciated, when the appendage 35 of the member 8 bears upon the rear stop element 28, it is possible to obtain a temporary approach of the parts 33 and 34 against the action of the elastic element 36. As will be seen, this can be obtained by pushing a capsule 6 so that it comes to rest, with its flange 6d (FIG. 2), in the inclined plane represented by the surface 31.

In a preferred embodiment, the elastic element 36 is formed integrally in the body 30 of the supporting member 8, which is preferably made of plastic material, in particular a mouldable thermoplastic material. In the example illustrated, the elastic element 36 is hence made of a single piece with the parts 33 and 34 of the body 30.

In one embodiment, the switchable arrangement for supporting the capsules comprises engagement means, configured for keeping the supporting member 8 in the advanced position or else in the retracted position during movement of the injector 5 towards the close position or else towards the spaced apart position relative to the capsule-holder 4, respectively. Advantageously, these engagement means are switchable between an operative condition and an inoperative condition, following upon mechanical interference between the body 30 of the supporting member 8 and the corresponding stop elements, such as the elements 27 and 28. In a particularly advantageous embodiment, the supporting arrangement comprises first engagement means, for keeping the member 8 in its advanced position, and second engagement means, for keeping the member 8 in its retracted position.

In a preferred embodiment, the aforesaid engagement means comprise at least one engagement element and a seat that can be engaged by the engagement element. The engagement element may be provided in the body 30 of the member 8, whereas the seat may be provided in the injector 5, in particular at its lower guide 26. Obviously, an opposite arrangement between the aforesaid parts is possible.

In one embodiment, the at least one engagement element is defined in a further elastic element of the body 30 of the supporting member 8, in particular an elastic element that is designed to be engaged in the guide 26.

With reference, for example, to the embodiment exemplified in FIGS. 8 and 9, the body 30 has two further elastic elements 37, which extend backwards starting from the intermediate part 34. In the example, the further elastic elements 37 are in the form of flexible arms 37 that extend in an axial direction of the body 30.

The two flexible arms 37 are generally set parallel to one another and at a distance such as to enable them to be received in the guide 26. Each arm 37 has, on its external profile, two different engagement elements, represented by projections 38 and 39. In the example, the projection 38 is defined substantially at the distal end of the respective arm 37 and is tooth-shaped. The projection 39 is, instead, in an intermediate area of the arm 37 and has a generally rounded profile or a profile distinguished by two opposite inclined surfaces.

The arms are designed to slide in the recesses 26a of the guide 26 in a pre-loading condition, i.e., with the external profile of the projections 38 and 39 that is urged elastically against the bottom surface of the grooves 26a. As has been said previously, the seats 26c (see, for example, FIG. 8) are defined in the walls 26b of the guide 26 so that the projections 38 and 39 are urged into engagement in the seats themselves.

As may be appreciated, in a preferred embodiment, also the further elastic element 37, or each further elastic element 37, is formed integrally in the body 30 of the member 8, preferably together with the engagement elements 38, 39 that are provided.

With reference to the embodiment illustrated, when the injector 5 is in its retracted position, i.e., of maximum distance from the capsule-holder 4 (as, for example, shown in FIGS. 10 and 11), the appendage 35 of the supporting member 8 bears upon the stop element 28, and the supporting portion of the member 8 is on the outside of the recess (21*b*, FIG. 8) of the front of the injector 5. In this condition, the lid 21 of the injector is in its advanced position, owing to the action of the corresponding spring 25.

Each toothed projection 38 operates so as to engage at the rear end of the guide 26, i.e., at the corresponding side wall 26*b* (FIG. 8), which thus provides a seat for the engagement element; the intermediate projection 39 engages, instead, the seat 26*c*. In this condition, then, a lower region of the flange of the capsule loaded into the assembly 2 can rest on the inclined surface 31 (FIG. 9) of the supporting portion of the member 8, with the capsule that is kept in a position substantially coaxial to the injector and the capsule-holder.

Subsequent operation of the actuation system 11 causes advance of the injector, during which the front part of the body 30 (i.e., its part 32 and/or 33, FIG. 9) comes to bear upon the front stop element 27. As advance of the injector 5 proceeds, it causes recession of the supporting member 8, with consequent switching of the engagement means 37-39. It should be noted that, following upon interference with the stop element 27, there is a compression of the elastic element 36 (FIG. 9). Further advance of the injector in any case causes a backward displacement of the member 8 and switching of the engagement means. In this step, moreover, since the capsule has by now entered right into the capsule-holder, the lid 21 of the injector 5 moves into the respective retracted position.

Backward sliding of the member 8 causes disengagement of the intermediate projections 39 from the seats 26*c*. The front edge of each projection 39 is now located at the rear end of the guide 26, and the supporting portion 32 is still positioned on the outside of the recess 21*b* of the front of the injector 5, given the retracted condition of the lid 21. This condition of the member 8 and of the corresponding engagement means is substantially similar to the one visible in FIGS. 12 and 13 (in actual fact, these figures refer to a step of return of the injector 5 towards the initial position).

Figure 12:
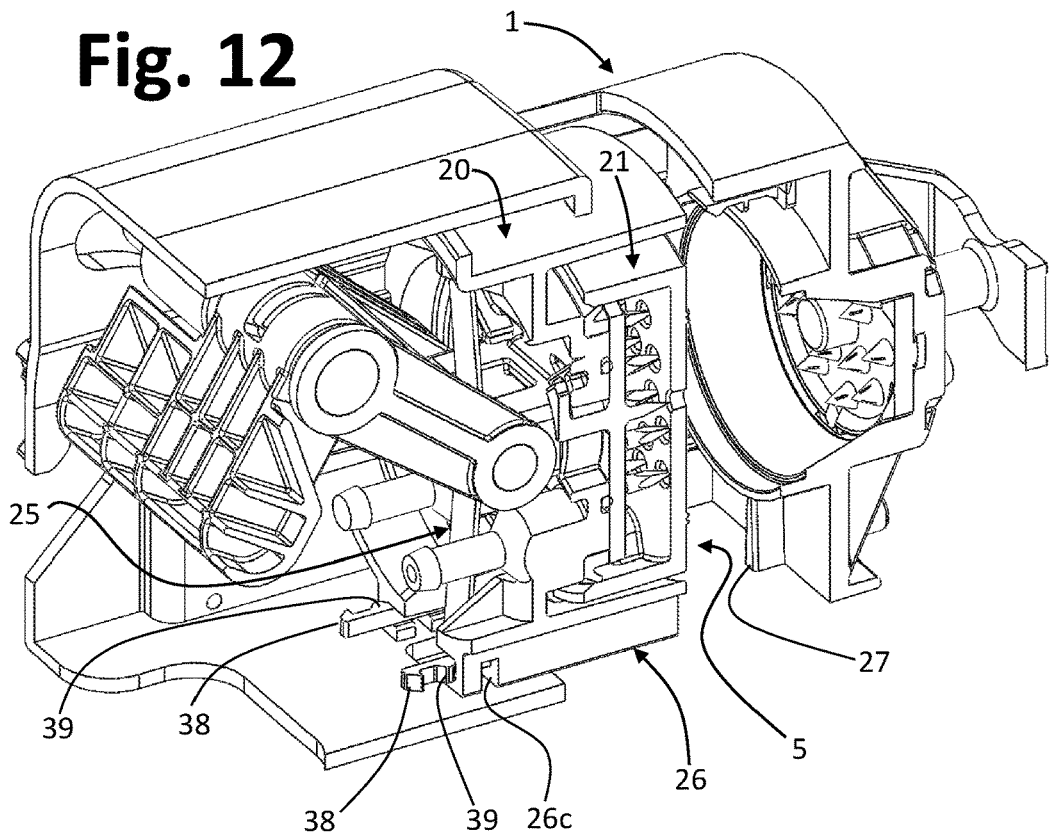
FIGS. 12 and 13 are views similar to that of FIGS. 10-11, with the assembly in a second condition.

After preparation of the liquid product, the actuation system 11 is again actuated for bringing the injector 5 back from the close position to the spaced apart position relative to the capsule-holder, as may be seen in FIGS. 12-13. In this step, the supporting member 8 is kept in the respective retracted condition. The lid 21 can return to the respective advanced position as a result of the action of the spring 25. In this way, the supporting portion of the member 8 is housed within the recess 21*b*, in particular, it is kept elastically in contact with the bottom of the recess owing to the action of the spring 25 and/or of the elastic element 36 of the member 8. The latter is kept in position at the opposite part thanks to the engagement projections 39.

The lower appendage 35 of the supporting member 8 progressively approaches the rear stop element 28, as may be seen in FIG. 13, until it comes into contact therewith, just before reaching the end-of-travel position of the injector 5. Interference between the appendage 35 and the element 28, together with the further recession of the injector 5, causes return of the member 8 into its advanced condition, with consequent switching of the engagement means 37-39, which return into the condition illustrated in FIGS. 10 and 11.

In FIGS. 3-13, the capsule introduced into the assembly 2 is not represented for reasons of greater clarity of the drawings. An example of possible operation of the assembly will now be summarized with reference to FIGS. 14-21, where a capsule 6 is represented (in these figures, the different conditions of bending of the spring inside the injector are not highlighted).

Figure 14:
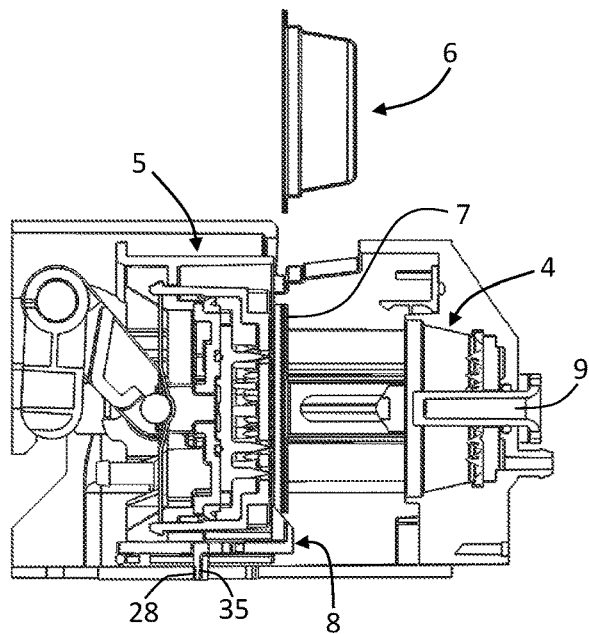
FIGS. 14-21 are schematic cross-sectional views of a delivery assembly of a machine according to one embodiment of the invention, in various operating conditions of an operating cycle.
Figure 15:
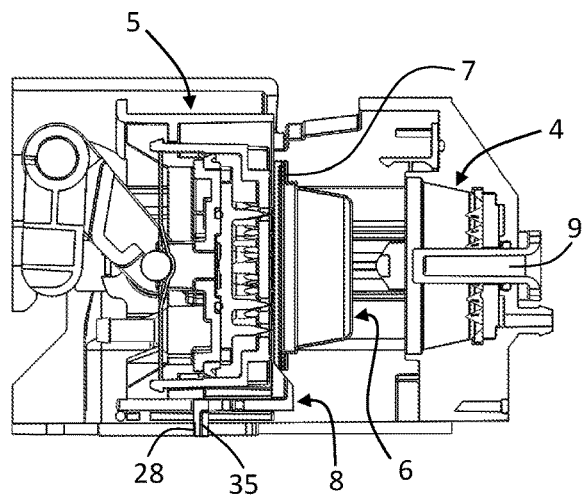
Figure 16:
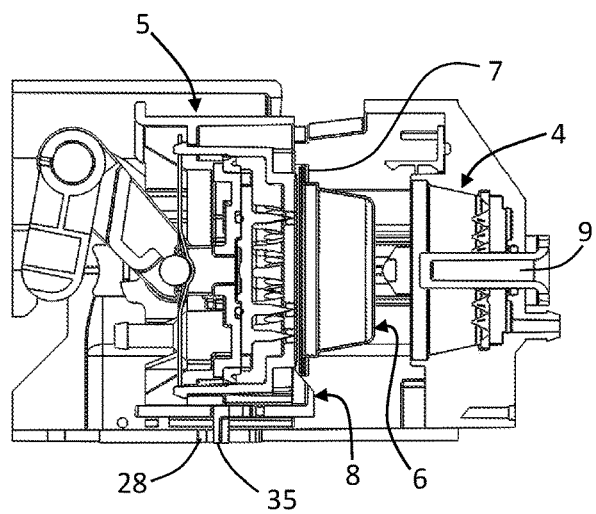
Figure 17:
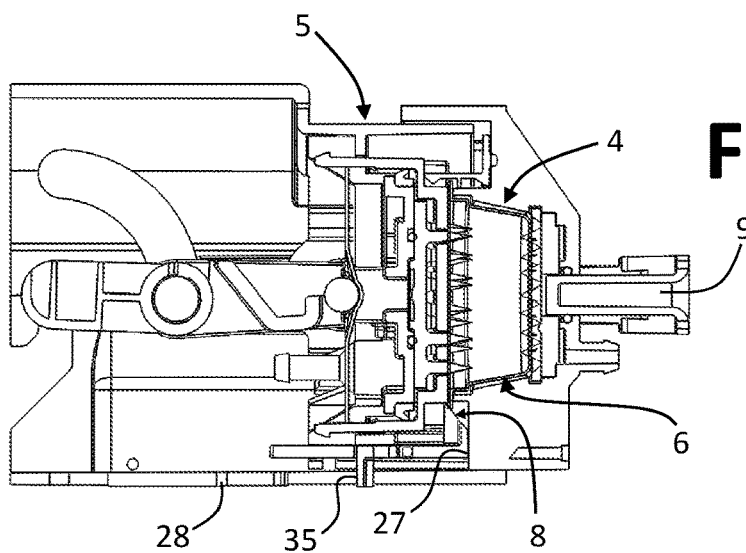
Figure 18:
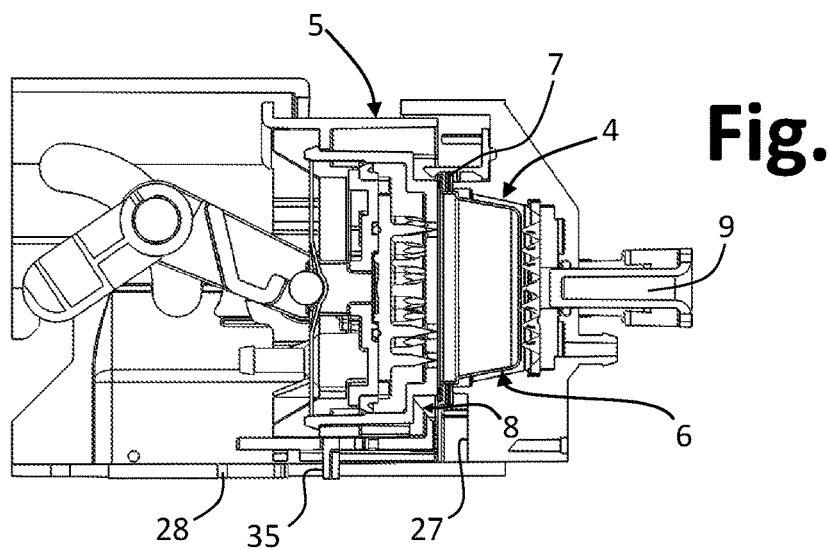
Figure 19:
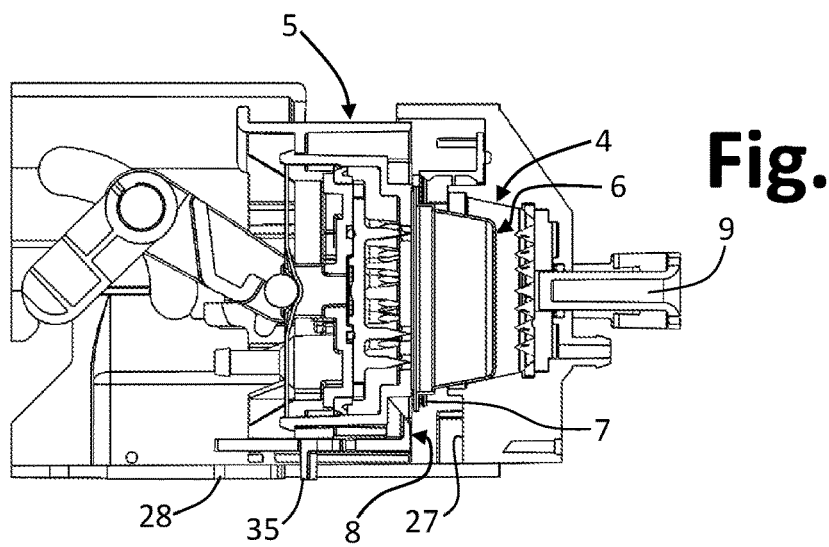
Figure 20:
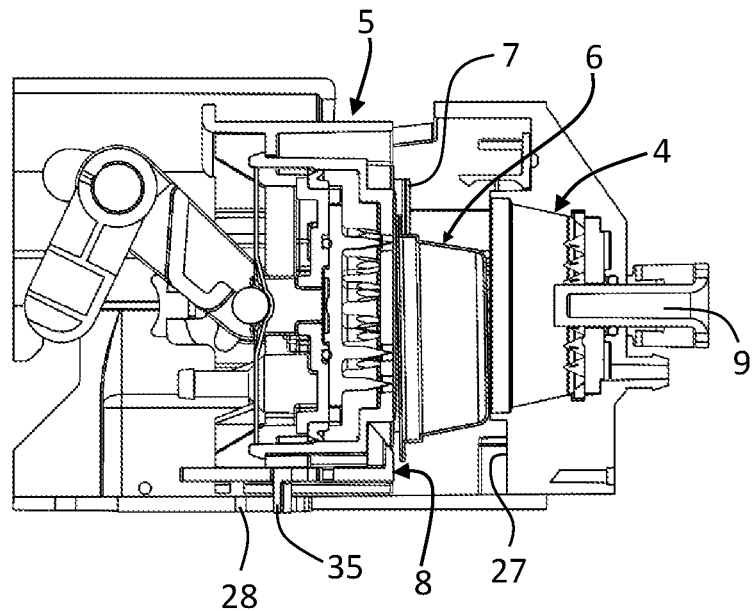

FIG. 14 exemplifies the step of insertion of the capsule 6 into the assembly 2, with the injector 5 in the spaced apart position relative to the capsule-holder 4 and with the supporting member in an advanced position. The capsule 6 inserted in the assembly is taken up by the vertical guides 7, until it reaches the position where it is substantially coaxial to the injector and the capsule-holder. In this condition, a lower part of the flange of the capsule 6 rests on the top inclined surface of the member 8, as may be seen in FIG. 15. Next, the actuation system is operated for bringing the injector into the close position relative to the capsule-holder, with the capsule still supported by the member 8, as in FIG. 16. In the course of advance of the injector 5, the member 8 interferes with the stop element 27, thereby passing into its retracted position. Also the front of the injector recedes following upon contact with the front of the capsule 6, when the latter can no longer proceed into the capsule-holder 4. FIG. 17 illustrates the end-of-travel position of advance of the injector. It should be noted that, in the course of advance of the injector 5, there is a corresponding recession of the ejector member 9 into the capsule-holder, for the reasons explained previously. It should be noted that at least one of the capsule-holder 4 and/or the insertion guides 7 is shaped for enabling passage of the guides 7 beyond the front edge of the capsule-holder, in the course of displacement of the injector 5. Hence, in other words, the guides 7 are designed to overcome, as they advance, the front edge of the capsule-holder 4.

After preparation of the liquid product, which occurs with modalities in themselves known, the actuation system is operated in a direction opposite to the previous one. The injector 5 recedes towards the spaced apart position relative to the capsule-holder 4, with the front of the injector that can return into the respective advanced position. In this way, the supporting portion of the member 8 is housed in the corresponding front recess of the injector, as may be seen, for example, in FIGS. 18 and 19, which show successive moments of the movement of return of the injector 5 towards the initial position. The spent capsule 6 can be extracted from the capsule-holder 4 via the guides 7, which are purposely shaped, or else by means of the ejector member 9 that starts to advance into the capsule-holder. It should be noted that, in the condition illustrated in FIG. 20, the member 8 is still in the retracted position. In the cases where the capsule 6 is extracted from the capsule-holder 4 via the guides 7, the capsule itself is free to slide by gravity along the guides themselves, towards the discharge outlet of the assembly, without its fall being hindered by the member 8.

Figure 21:
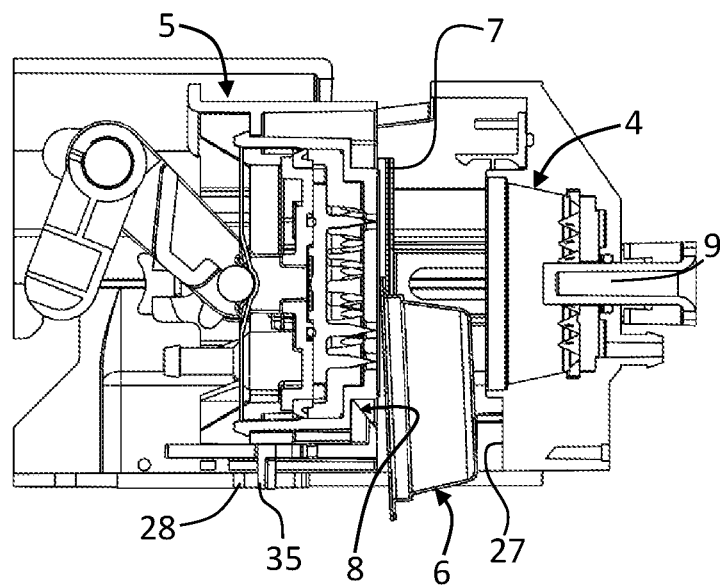

The lower appendage 35 of the supporting member 8 then interferes with the stop element 28 so that, as the movement of the injector 5 proceeds, the member 8 has moved again into its advanced condition, as may be seen in FIG. 21.

Figure 23:
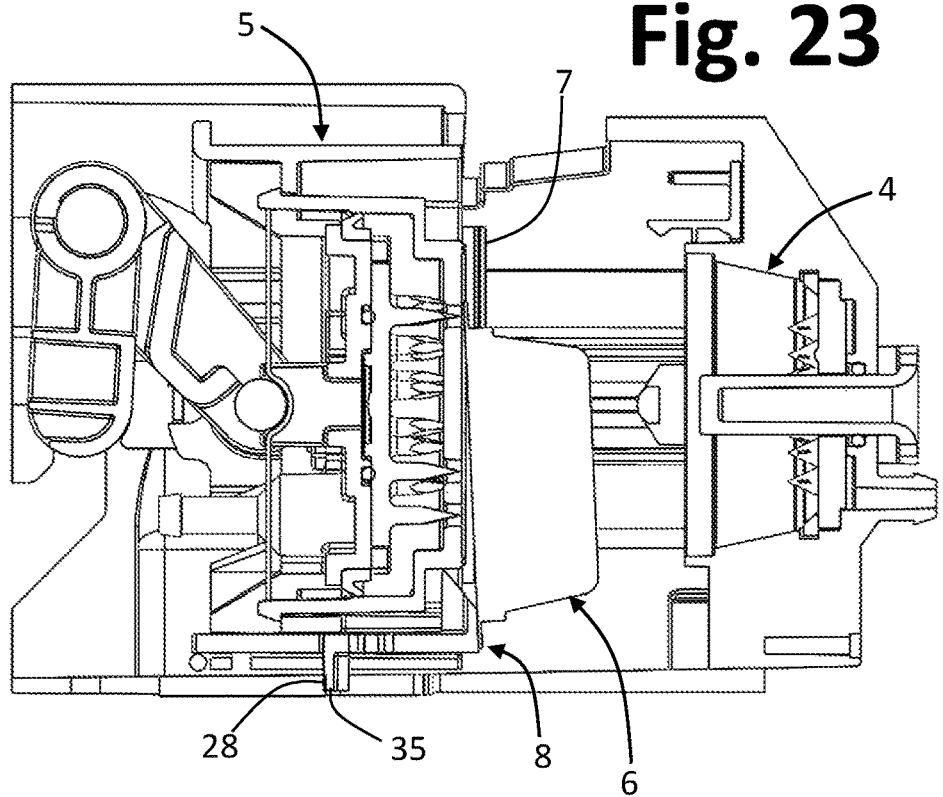
Figure 24:
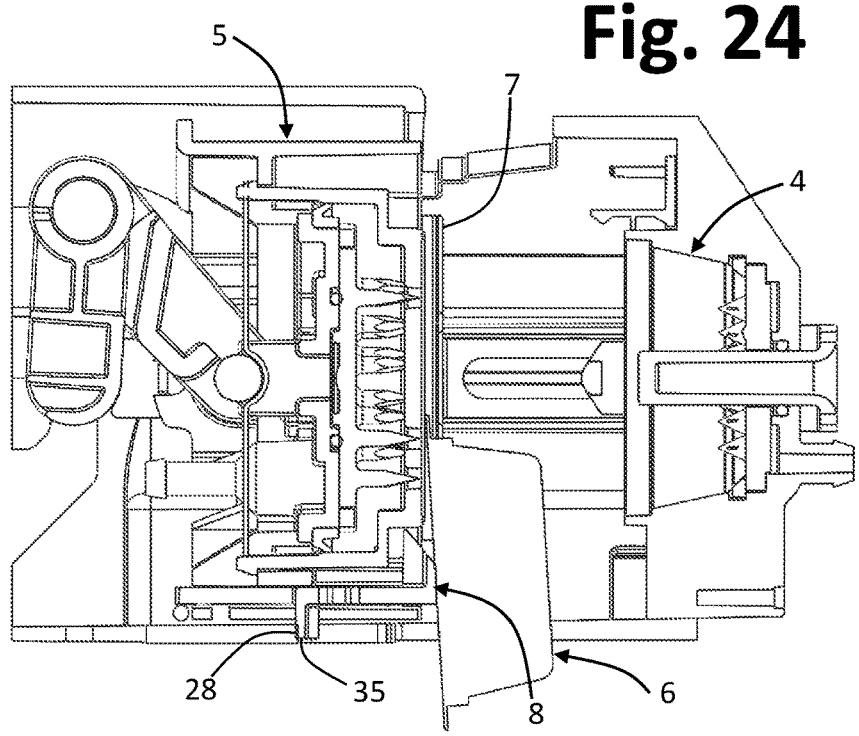
Figure 25:
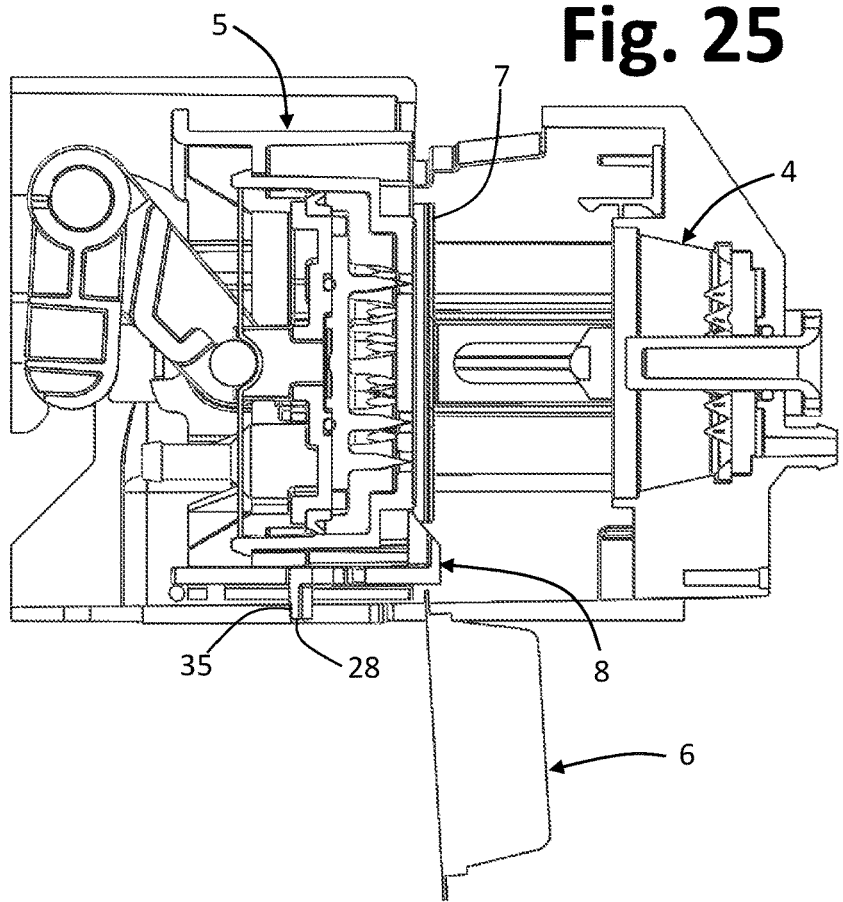

FIGS. 23-25 illustrate, instead, a mode of manual discharge, which, thanks to the invention, can be carried out in all those situations where, for a any reason (see the introductory part of the present description), the front of a spent capsule remains adjacent or close to the front of the injector 5, even following upon return of the latter into the initial position.

Figure 22:
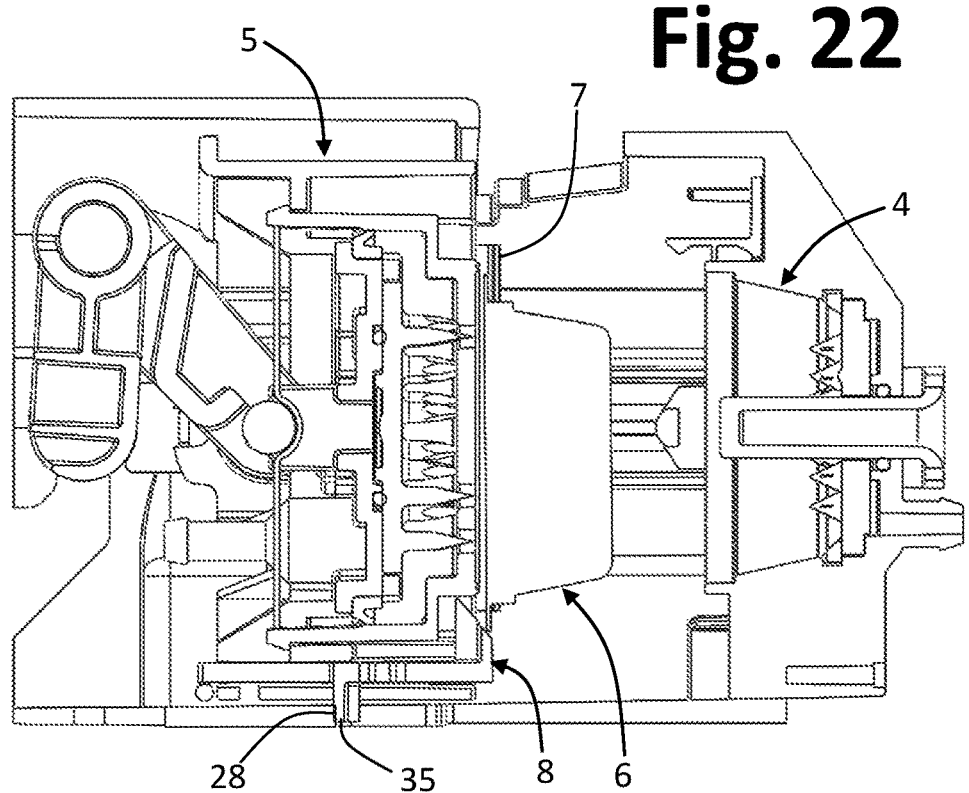
FIGS. 22-25 are schematic cross-sectional views of a delivery assembly of a machine according to one embodiment of the invention, in various steps of a procedure of manual expulsion of a capsule.

In this anomalous condition, as may be seen in FIG. 22, a lower part of the flange of the capsule 6 is resting on or overlies the inclined surface 31 of the supporting portion 32 of the member 8 (see FIG. 9). A downward thrust can thus be applied from above on the capsule 6, i.e., towards the outlet passage of the assembly, for example using the fingers of one hand or else pushing a new capsule 6 into the assembly 2 through its upper inlet passage.

The force exerted downwards is imparted by the flange of the spent capsule 6 on the inclined surface of the supporting member 8. Notwithstanding the fact that the lower appendage 35 of the member 8 bears upon the corresponding stop element 28, the front part of the member itself can start to recede, against the action of the elastic element 36 (FIG. 9). The flange of the capsule slides on the inclined surface of the member 8, bringing about the aforesaid recession. In this way, with reference to the example illustrated—see FIG. 23—also the supporting portion of the member 8 can recede towards the inside of the corresponding recess of the front of the injector 5 so as to enable forced displacement of the spent capsule 6 downwards, as may be seen in FIG. 24, with the front of the capsule that slides on the front part of the member 8. As contact between the capsule 6 and the member 8 ceases, the latter can return into its advanced position, as exemplified in FIG. 25, owing to the action of the elastic element 36.

From the foregoing description, the characteristics of the present invention emerge clearly, as do likewise its advantages. The supporting arrangement provided is simple and inexpensive to produce, and reliable, not requiring additional springs for bringing the supporting member back into position. In conditions of normal (i.e., not anomalous) operation of the delivery assembly, the displacements of the supporting member are obtained only following upon mechanical interference of the member itself with fixed stop elements. A substantial advantage of the invention lies in the possibility of bringing about manually a temporary recession of the supporting member against the action of its elastic element in order to solve situations of sticking of the capsules.

Without prejudice to the principle of the invention, the details of construction and the embodiments may vary, even significantly, from what has been illustrated herein purely by way of non-limiting example, without thereby departing from the scope of the invention as defined in the annexed claims.

It will be appreciated that the elastic element that enables the aforesaid temporary recession of the supporting member does not necessarily have to be integrated in, or associated to, the body of the latter. For instance, in a variant embodiment, the functions of the elastic element 36 may be associated to or integrated in the rear stop element. For instance, the rear stop element may present a body defining a contrast surface for the corresponding part 35 of the supporting member, with this body that is supported elastically so as to enable, if need be, the aforesaid temporary recession, in a way similar to what has been described previously.

According to a further variant embodiment, the functions of the elastic element 36 can be integrated in the element of the supporting member designed to co-operate with the rear stop element 28. In this perspective, for example, the appendage 35 described previously can be shaped for integrating, or having associated, an elastic element designed to enable, if need be, the aforesaid temporary recession of the supporting member.

The invention claimed is:

1. A machine for the preparation of a liquid product via a capsule having a substantially cup-shaped body that houses a dose of at least one substance that can form the liquid product via a preparation fluid, the machine having a delivery assembly, which comprises a stationary structure and a passage for introduction of the capsule, the assembly moreover comprising:
   a preparation chamber that includes a first part of chamber, having a housing configured for receiving at least partially the capsule and enabling delivery of the liquid product from the preparation chamber, and a second part of chamber configured for introduction of the fluid into the capsule;
   an actuation system controllable for causing movements of the second part of chamber with respect to the first part of chamber, between a spaced apart position and a close position;
   a supporting arrangement comprising a movable supporting member, which is able to keep the capsule in a position that is substantially coaxial to the parts of chamber, and a first stop element and a second stop element for the supporting member,
   wherein the supporting member is mounted displaceable in a corresponding guide provided in a lower part of a body of the second part of chamber, between an advanced position of retention, in which the capsule is kept in said position that is substantially coaxial to the parts of chamber, and a retracted position of release, in which the capsule can drop towards an outlet passage of the delivery assembly;
   wherein the supporting member has a body that is able to interfere mechanically with the first stop element during movement of the second part of chamber towards the close position and is able to interfere mechanically with the second stop element during movement of the second part of chamber towards the spaced apart position, in such a way that the supporting member is displaceable from the position of retention to the position of release during movement of the second part of chamber towards the close position and is displaceable from the position of release to the position of retention during movement of the second part of chamber towards the spaced apart position,
   wherein at least one of the body of the supporting member and the second stop element comprises a first elastic element and
   wherein the supporting arrangement is configured for enabling, with the second part of chamber in the spaced apart position, a temporary recession of the supporting member towards the position of release, against the action of the first elastic element and following upon application on the capsule of a force of thrust towards the outlet passage.

2. The machine according to claim 1, wherein the body of the supporting member defines an inclined surface for resting the capsule.

3. The machine according to claim 2, wherein the body of the supporting member has a generally flattened configuration, from which there projects upwards a supporting portion defining said inclined surface.

4. The machine according to claim 1, wherein:
   the body of the supporting member has a first part and a second part that are able to interfere mechanically with the first stop element and the second stop element, respectively; and
   the first elastic element is operatively set between the first part and the second part of the body of the supporting member and is operative for urging them into a position where they are set apart from one another, the body of the supporting member being configured for enabling a temporary mutual approach of the first part and the second part against the action of the first elastic element.

5. The machine according to claim 4, wherein the second part comprises a portion of the body of the supporting member projecting downwards.

6. The machine according to claim 1, wherein the supporting arrangement further comprises engagement means configured for keeping, in an operating condition thereof, the supporting member in the position of retention or else in the position of release during movement of the second part of chamber towards the close position or else towards the spaced apart position, respectively, the engagement means being switchable between the operating condition and an inoperative condition thereof following upon mechanical interference between the supporting member and the first and second stop elements.

7. The machine according to claim 6, wherein the engagement means comprise at least one engagement element and one seat engageable by the engagement element, one of the engagement element and the seat being on the body of the supporting member and the other one of the engagement element and the seat being on the second part of chamber/position of retention.

8. The machine according to claim 7, wherein:
one of the engagement element and the seat is defined in a second elastic element of the body of the supporting member, the second elastic element being engaged in the guide provided in the lower part of the second part of chamber; and
the other one of the engagement element and the seat is defined in a wall of the guide against which the engagement element is slidable and urged elastically by means of the second elastic element.

9. The machine according to claim 8, wherein the body of the supporting member has two second elastic elements generally parallel to one another, each of which is provided with at least one said engagement element that is slidable and urged elastically against a wall of said guide provided with a corresponding said seat.

10. The machine according to claim 8, wherein the second elastic element is formed integrally in the body of the supporting member and comprises a flexible arm that extends in an axial direction of the body of the supporting member.

11. The machine according to claim 6, wherein the supporting arrangement comprises engagement means for keeping the supporting member in the position of retention and engagement means for keeping the supporting member in the position of release.

12. The machine according to claim 1, wherein the first elastic element is formed integrally in the body of the supporting member.

13. The machine according to claim 1, wherein the delivery assembly comprises guide means at generally opposite side parts of the second part of chamber, the guide means being configured for constraining the capsule laterally and guiding it into said position that is substantially coaxial to the first part of chamber and to the second part of chamber.

14. The machine according to claim 13, wherein the guide means are movable together with the second part of chamber.

15. The machine according to claim 1, wherein the preparation fluid is water.

16. The machine according to claim 1, wherein the preparation fluid is steam.

17. The machine according to claim 1, wherein the preparation fluid is water and steam.

* * * * *